United States Patent [19]  
Fischer et al.

[11] 4,016,067  
[45] Apr. 5, 1977

[54] PROCESS FOR DEMETALATION AND DESULFURIZATION OF PETROLEUM OILS

[75] Inventors: Ronald H. Fischer; Donald Milstein, both of Cherry Hill, N.J.

[73] Assignee: Mobil Oil Corporation, New York, N.Y.

[22] Filed: Feb. 21, 1975

[21] Appl. No.: 551,948

[52] U.S. Cl. .............................. 208/89; 208/210; 208/251 H
[51] Int. Cl.$^2$ ................. C10G 23/02; C10G 23/16
[58] Field of Search .............. 208/210, 251 H, 216, 208/89

[56] References Cited
UNITED STATES PATENTS

| | | | |
|---|---|---|---|
| 3,530,066 | 9/1970 | Kuwata et al. | 208/210 |
| 3,696,027 | 10/1972 | Bridge | 208/210 |
| 3,725,251 | 4/1973 | Alpert et al. | 208/210 |
| 3,841,995 | 10/1974 | Bertolacini et al. | 208/210 |
| 3,876,523 | 4/1975 | Rosinski et al. | 208/251 H |

Primary Examiner—George Crasanakis  
Attorney, Agent, or Firm—Charles A. Huggett; Vincent J. Frilette

[57] ABSTRACT

This invention is concerned with removing metal and sulfur contaminants from residual oil fractions by catalytic contact in a novel dual bed system. In this process the oil is first contacted with a catalyst comprising a Group VIB metal and an iron group metal oxide, such as a mixture of cobalt and molybdenum oxides, composited with an alumina support that contains delta or theta phase alumina, the catalyst having at least 60% of its pore volume in pores of 100A to 200A diameter, at least about 5% of its pore volume in pores having a diameter greater than 500A, and a surface area up to about 110m$^2$/g. The oil is then contacted with a second catalyst of the high surface-area, cobalt-molybdenum on alumina type. The second catalyst has a major fraction of its pores in the 30 to 100A diameter range.

9 Claims, 6 Drawing Figures

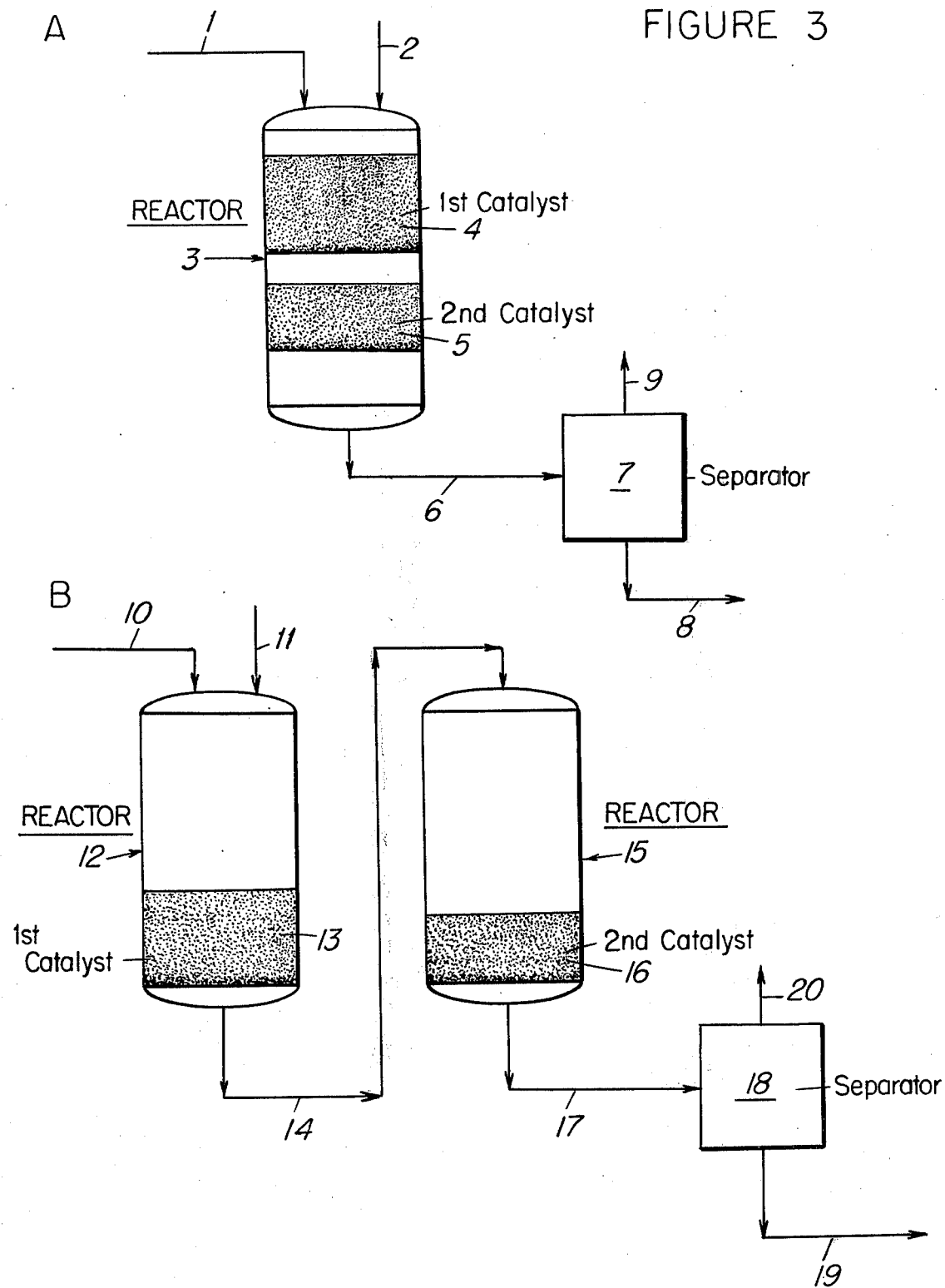

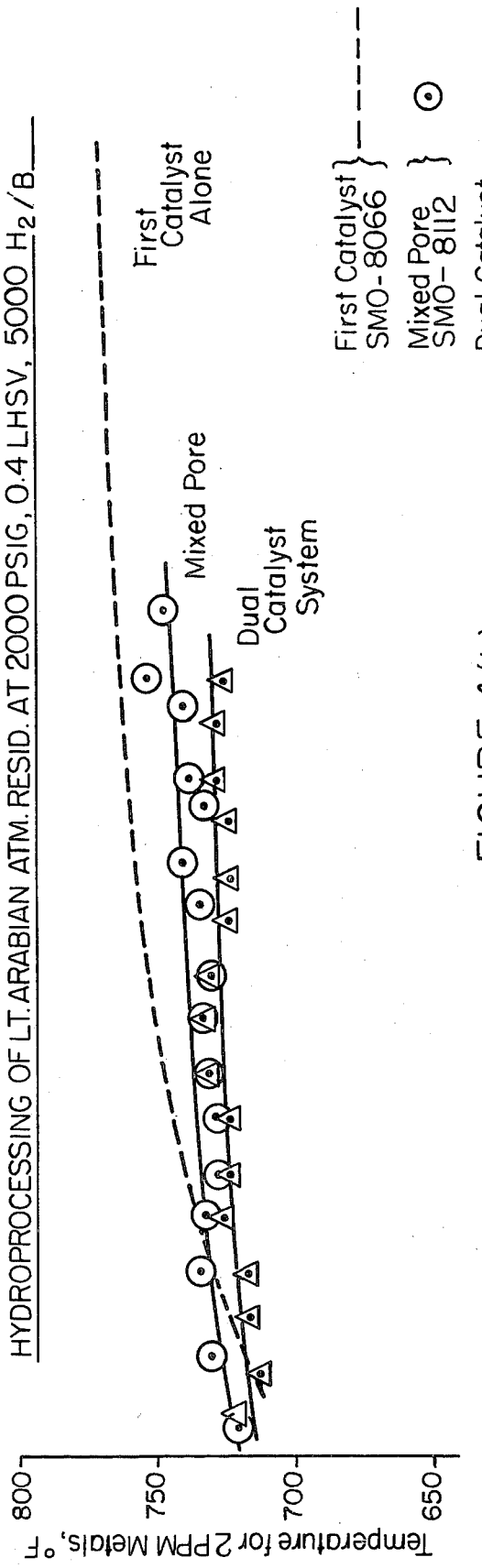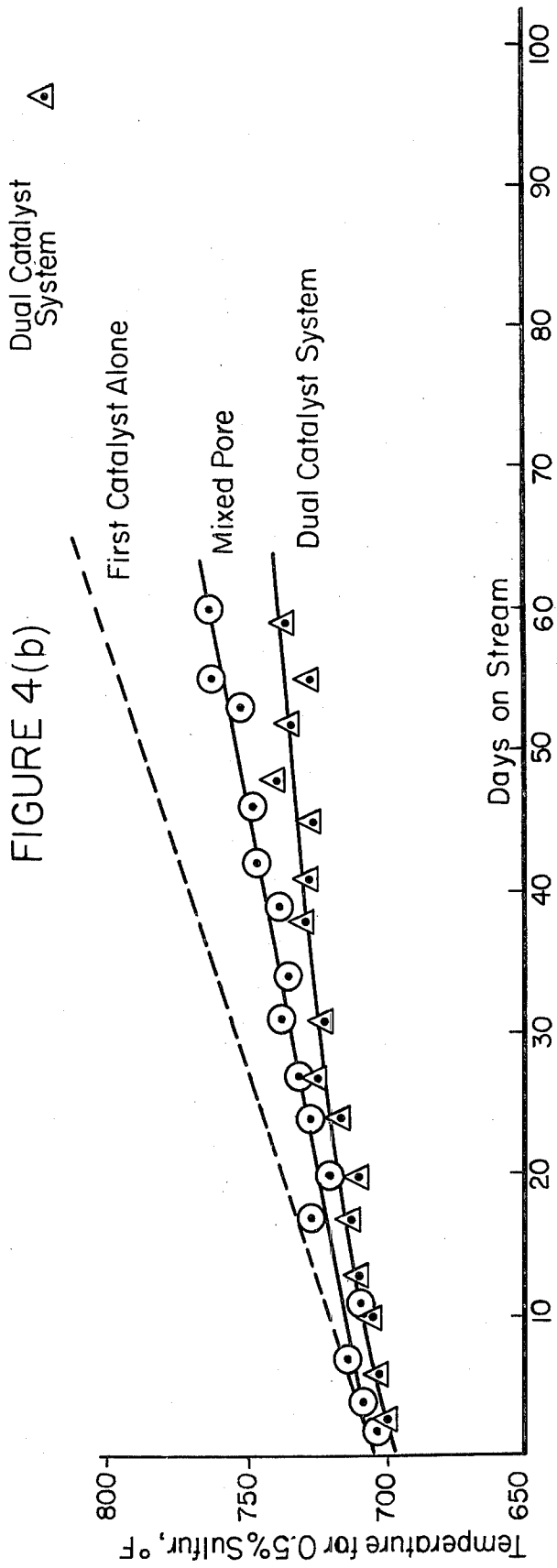

FIGURE 6
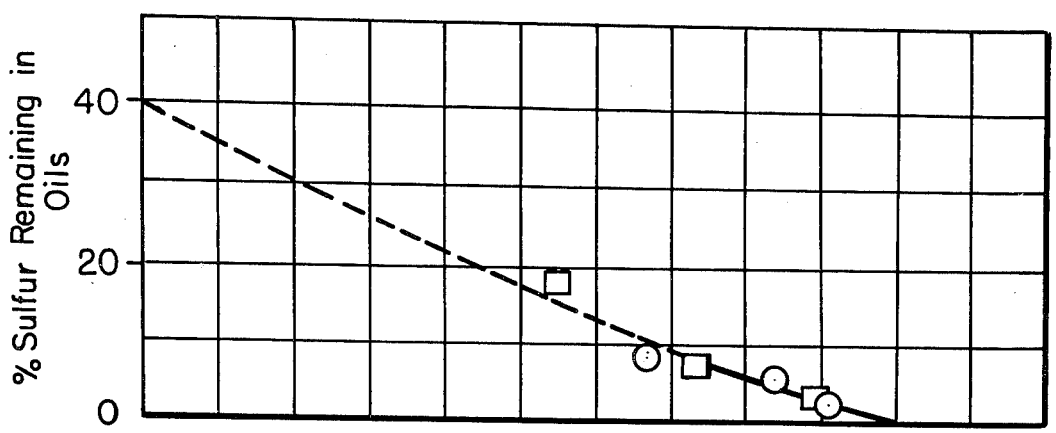
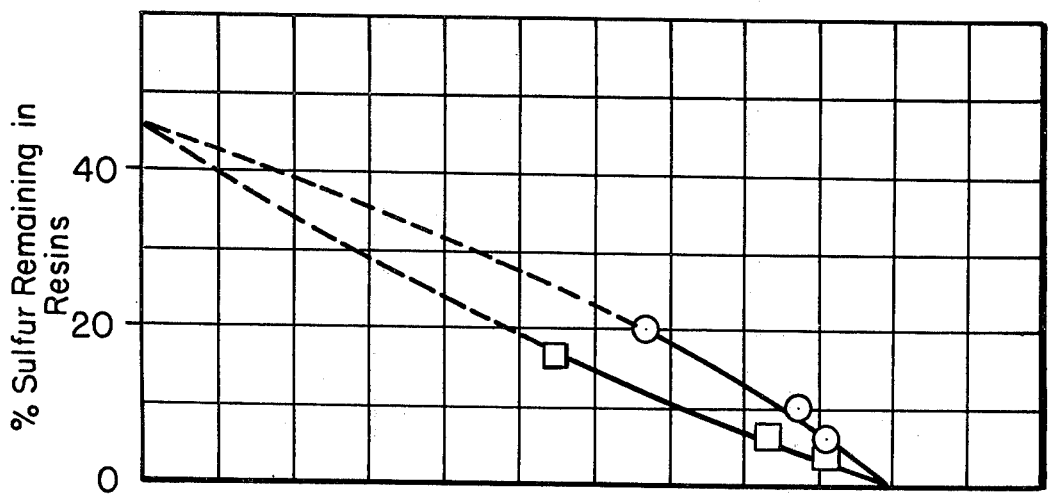
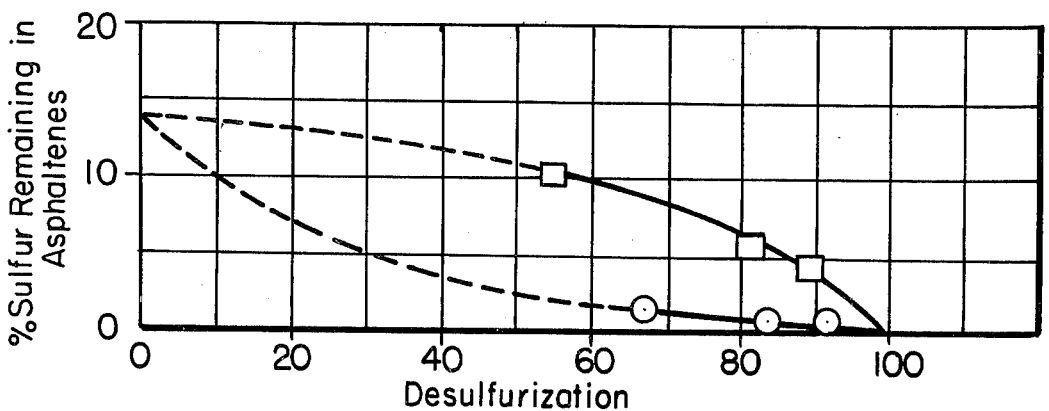

PROCESS FOR DEMETALATION AND DESULFURIZATION OF PETROLEUM OILS

BACKGROUND OF THE INVENTION

1. Field of the Invention

This invention is concerned with an improved catalytic process for the demetalation and desulfurization of petroleum oils, preferably those residual fractions that have undesirably high metals and/or sulfur content. More particularly, the invention involves two catalysts with distinctly different pore sizes, arranged in a dual catalyst system that is especially effective for the demetalation and desulfurization of petroleum oils. Both catalysts are exemplified by the cobalt-molybdenum on alumina type.

2. Description of the Prior Art

Residual petroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. This is so because the metal contaminants deposit on the special catalysts for these processes and cause the formation of inordinate amounts of coke, dry gas and hydrogen.

It is current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800 to 1100° F temperature and a pressure of one to ten atmospheres. The economic value of the coke by-product is determined by its quality, especially its sulfur and metals content. Excessively high levels of these contaminants makes the coke useful only as low-valued fuel. In contrast, cokes of low metals content, for example up to about 100 p.p.m. (parts-per-million by weight) of nickel and vanadium, and containing less than about 2 weight percent sulfur may be used in high valued metallurgical, electrical, and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800° to 1500° F, a pressure of about 1 to 5 atmospheres, and a space velocity of about 1 to 1000 WHSV.

The amount of metals present in a given hydrocarbon stream is often expressed as a chargestock's "metals factor". This factor is equal to the sum of the metals concentrations, in parts per million, of iron and vanadium plus ten times the concentration of nickel and copper in parts per million, and is expressed in equation form as follows:

$$F_m = Fe + V + 10\,(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for cracking chargestocks.

Metals and sulfur contaminants present similar problems with regard to hydrocracking operations which are typically carried out on chargestocks even lighter than those charged to a cracking unit. Hydrocracking catalyst is so sensitive to metals poisoning that a preliminary or first stage is often utilized for trace metals removal. Typical hydrocracking reactor conditions consist of a temperature of 400° to 1,000° F and a pressure of 100 to 3,500 p.s.i.g.

It is evident that there is considerable need for an efficient method to reduce the metals and/or sulfur content of petroleum oils, and particularly of residual fractions of these oils. While the technology to accomplish this for distillate fractions has been advanced considerably, attempts to apply this technology to residual fractions generally fail due to very rapid deactivation of the catalyst, presumably by metals contaminants.

U.S. Pat. No. 3,730,879 issued May 1, 1973 discloses a two-bed catalytic process for the hydrodesulfurization of crude oil or a reduced fraction, in which at least 50 percent of the total pore volume of the first-bed catalyst consists of pores in the 100–200 Angstrom diameter range.

U.S. Pat. No. 3,830,720 issued Aug. 20, 1974 discloses a two-bed catalytic process for hydrocracking and hydrodesulfurizing residual oils, in which a small pore catalyst is disposed upstream of a large-pore catalyst.

U.S. Pat. No. 3,876,523 issued Apr. 8, 1975 describes a novel catalyst and a process for catalytically demetalizing and desulfurizing hydrocarbon oils comprising residual fractions. This entire specification is incorporated herein by reference. The process described therein utilizes a catalyst comprising a hydrogenation component, such as cobalt and molybdenum oxides, composited on an alumina at least a portion of which is in the delta and/or theta phase, with at least 60% of the pore volume of the catalyst in pores having a diameter of 100 Angstroms to 200 Angstroms, also having at least about 5% of the pore volume contributed by pores having a diameter greater than 500 Angstroms and having other characteristics as hereinafter described. As will be shown, although this catalyst is highly effective for demetalation of residual fractions and has good stability with time on stream, its utility is remarkably improved when this catalyst is employed in a particular manner in combination with a second catalyst having different critical characteristics. For convenience, a catalyst of the type described in U.S. Pat. No. 3,876,523 will be referred to herein as a first catalyst, it being understood that this first catalyst is to be situated upstream of the second catalyst having different characteristics.

BRIEF DESCRIPTION OF THE DRAWINGS

FIG. 3 illustrates two configurations of the apparatus of this invention, including the disposition of the first catalyst in relation to the second catalyst.

FIG. 4 (a) and 4 (b) show two sets of curves demonstrating the improved stability with time on stream of the dual catalyst system of this invention for metals and sulfur removal.

FIG. 6 is a curve showing desulfurization selectivity.

It has now been discovered that hydrocarbon oils, preferably residual fractions, are catalytically hydroprocessed to very effectively remove both metals and sulfur and with particularly slow aging of the catalyst system by contacting the oil sequentially with two catalysts of different characteristics. The first catalyst, located upstream of the second catalyst, is characterized by having at least 60% of its pore volume in pores greater than 100A. in diameter and other characteristics hereinafter specified. The second catalyst, located downstream with respect to the first catalyst, is characterized by having a major fraction of its pore volume in pores less than 100A. in diameter.

The novel dual catalyst apparatus may be used to demetalize and/or desulfurize any hydrocarbon oil that has metals and/or sulfur content undesirably high for a particular application. The dual catalyst apparatus is particularly effective for preparing low metals and/or low sulfur content feedstocks for catalytic cracking or for coking. In the processing to remove metals and sulfur, the hydrocarbon oil also is concomitantly enriched in hydrogen, making it an even more suitable chargestock for either of these processes.

DETAILED DESCRIPTION OF THE INVENTION

The preferred first catalyst of the dual catalyst system is selected from the class of catalysts comprising a hydrogenating component (cobalt and molybdenum in a preferred embodiment) composited with an alumina support having a demonstrable content of delta and/or theta alumina. The preferred composite catalyst also has at least 60% of its pore volume in pores having a diameter of about 100A. to 200A., at least about 5% of the pore volume in pores greater than 500A. in diameter, and has a surface area of up to about 110 m$^2$/g. The first catalyst also has high-temperature phase delta and/or theta alumina present in sufficient quantity for it to be detectable by X-ray diffraction, i.e. it has a demonstrable content of delta and/or theta phase alumina.

Figure 1:
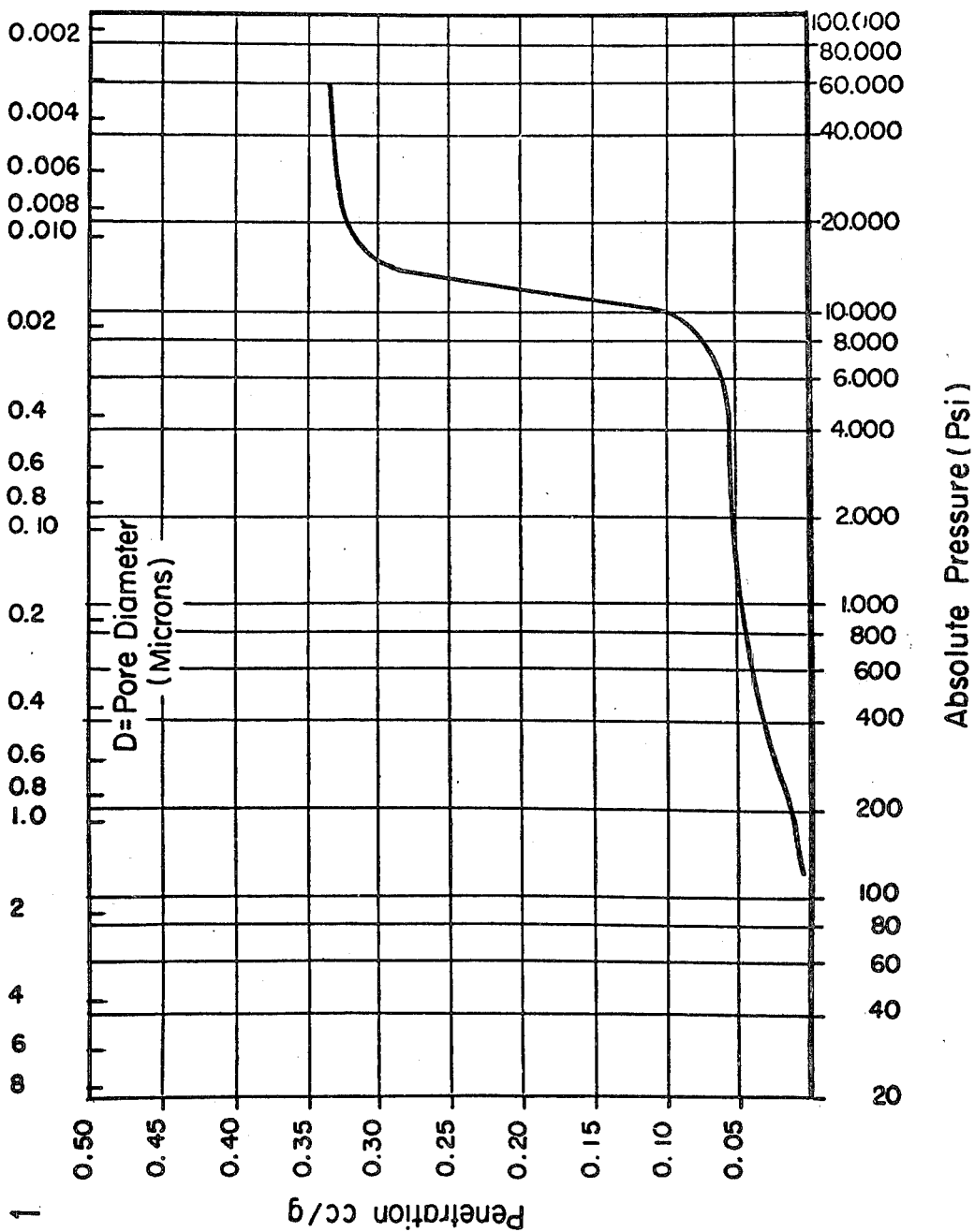
FIG. 1 is a porosity profile of a first catalyst of the class of this invention.
Figure 2:
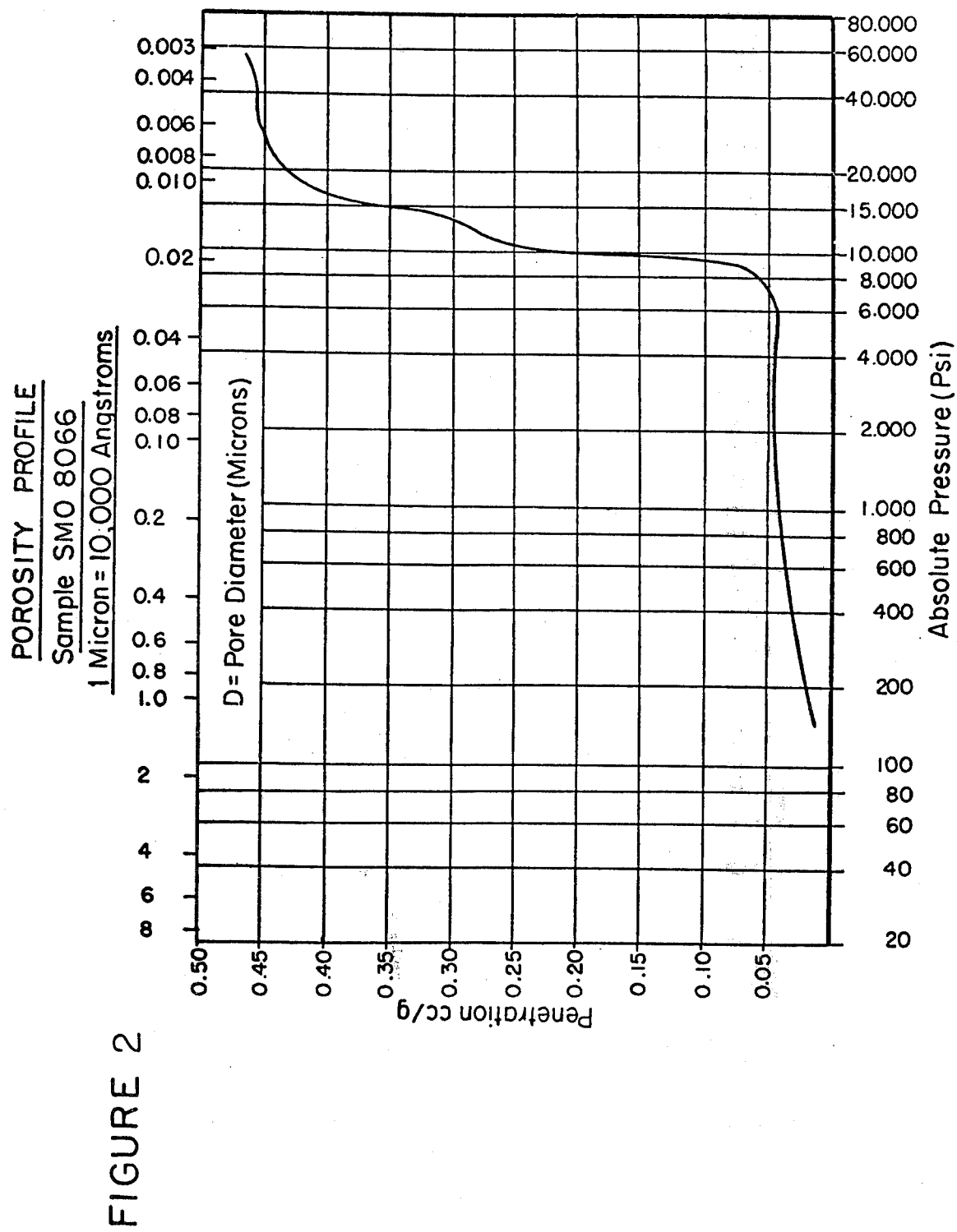
FIG. 2 is a porosity profile of another first catalyst of the class of this invention.

FIGS. 1 and 2 illustrate the porosity profiles of two catalysts of the class described. Such profiles are produced by plotting the amount of a fluid (in this case mercury) in cc/g forced into the pore structure as a function of pressure. As the pressure is increased, the mercury is forced into smaller and smaller pores. As is shown by these figures there is a dramatic increase in penetration with a small pressure increase, indicating that the structure has a large number of pores within a particular size range. The specific size is determined by a standard capillary tube equation calculation.

The second catalyst of the dual catalyst system of this invention is selected from the class of catalyst comprising a hydrogenation component (cobalt and molybdenum in a preferred embodiment) composited with a refractory base (alumina in a preferred embodiment), said composite catalyst having at least 50%, and preferably at least 60% of its pore volume contributed by pores that have a diameter of 30 to 100 angstroms, and a surface area of at least 150 square meters per gram, and preferably a surface area of at least 175 square meters per gram.

The hydrogenating component of the first and second catalysts disclosed herein can be any material or combination thereof that is effective to hydrogenate and desulfurize the chargestock under the reaction conditions utilized. For example, the hydrogenating component is selected from at least one member of the group consisting of Group VIB and the iron group metals in a form, such as metal oxides or sulfides, capable of promoting hydrogenation reactions. Especially effective catalysts for the purposes of this invention are those comprising molybdenum and at least one member of the iron group metals. Preferred catalysts are those containing cobalt and molybdenum, but other combinations of iron group metals and molybdenum may be used, such as iron, or zinc, or nickel and molybdenum, as well as combinations of nickel and molybdenum, cobalt and molybdenum, nickel and tungsten or other Group VIB or Group VIII metals of the Periodic Table taken singly or in combination. Particularly preferred compositions for the first and second catalysts to be used in the process of this invention are those that contain on a weight basis from about 2 percent to about 6 percent cobalt or nickel and from about 10 percent to about 16 percent molybdenum, the remainder consisting of alumina. These metals may be composited with the alumina by any of the known methods.

It is well known by those skilled in the art that the characteristics of composited alumina catalysts, such as the first and second catalysts in the process of this invention, depend to a very large extent on the properties of the alumina support. The first catalyst herein referred to is believed to have an unusual and novel physical structure especially as reflected in its phase composition and in its distribution of pore sizes. While this is more fully described in copending U.S. patent application Ser. No. 392,730 filed Aug. 29, 1973, it might be mentioned here that this catalyst may be prepared from a technical grade of boehmite, recovered from aluminum alkyl catalysts used in olefin polymerizations. Aside from a small amount of volatile organic alcohol, this boehmite has been found to be very pure, containing less than 0.01% of any silica, iron oxide, sodium oxide, and sulfur. Furthermore, in the preparation of the alumina support, it is required that the alumina be calcined to about 1950° F. This is about the transition point between the delta and theta alumina phases, and it is believed that the presence of either one or both of these phases in the catalyst is responsible for the unusual properties of the first catalyst.

The second catalyst of this invention may be commercial hydrodesulfurization catalyst such as Catalyst HDS-1441 manufactured by American Cyanamid Corporation. Commercially available alumina supports may be impregnated with cobalt and molybdenum salts followed by calcination. As commonly prepared on a commercial scale, the size of the pores of such alumina supports is largely concentrated at about 50 Angstroms diameter, and the alumina is of the gamma variety.

While various particulate forms of the first and second catalysts may be used in the dual bed system of this invention, it is preferred to use extrudate of about 1/20 to 1/40 inch diameter.

Two configurations of the dual catalyst system of this invention are illustrated in FIGS. 3A and 3B. Referring to FIG. 3A, the first catalyst 4 is disposed as a layer on top of a bed of second catalysts 5 contained in a reactor 3. In this single reactor configuration, the hydrocarbon oil is fed through line 1, and allowed to trickle through the dual bed system and exit through line 6. Hydrogen is fed to the system through line 2. The total effluent, comprising demetalized and desulfurized oil plus gaseous by-products and unused hydrogen is conducted by line 6 to a separator 7 where the gaseous products are disengaged and released through line 9. The treated oil exits from the separator 7 through line 8 and is recovered.

In a second configuration, illustrated by FIG. 3B, the first catalyst 13 is contained in reactor 12 and the second catalyst 16 is contained in a separate reactor 15. The hydrocarbon oil is introduced through line 10 into reactor 12 and trickles through the first catalyst 13, exiting through line 14 which feeds the oil then to reactor 15 where it trickles through the second catalyst 16 and exits through line 17. Hydrogen is fed to reactor 12 through line 11. The total effluent is carried by line 17 to a separator 18 where gaseous by-products and unused hydrogen are separated from the oil. The gaseous by-products are released through line 20, while the treated oil is discharged and recovered from line 19.

It will be recognized that in both of the configurations shown in FIG. 3, the hydrocarbon feed contacts the first catalyst before it contacts the second catalyst, i.e. the first catalyst is disposed upstream of the second catalyst. The first catalyst preferably should be present in from about 40 to 80 percent of the total catalyst volume, the second catalyst occupying the corresponding remainder of from about 60 to 20 percent. The higher proportions of first catalyst are preferred when the metal contamination is relatively high compared with the sulfur contamination and vice versa. While it is to be understood that other catalyst configurations and modes of operation may be used in the practice of this invention it is particularly preferred to operate the contacting of the feed with the dual bed system in trickle bed fashion.

Another manner of disposing the first and second catalysts which results in maintaining a low metals content in the treated oil is to resort to a three-zone arrangement, with a small fraction of the first catalyst placed at the end of the stream. Thus, in such an arrangement one may use 50 percent first catalyst, 40 percent second catalyst, and 10 percent first catalyst in sequence going downstream, percentages meaning percent of total catalyst volume in each instance.

Although presulfiding of the catalyst is preferred, this is not essential as the catalyst will normally become sulfided in a very short time by contact, at the process conditions disclosed herein, with the high sulfur content feedstocks to be used. The catalyst can be presulfided, after calcination, or calcination and reduction, prior to contact with the chargestock, by contact with a sulfiding mixture of hydrogen and hydrogen sulfide, at a temperature in the range of about 400° to 800° F, at atmospheric or elevated pressures. Presulfiding can be conveniently effected at the beginning of an on-stream period at the same conditions to be employed at the start of such period.

From what has been said, it will be clear that the feedstock can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 650° F. and containing a substantial quantity of asphaltic materials. Thus, the chargestock can be one having an initial or 5 percent boiling point somewhat below 650° F, provided that a substantial proportion, for example, about 70 or 80 percent by volume, of its hydrocarbon components boil above 650° F. A hydrocarbon stock having a 50 percent boiling point of about 900° F and which contains asphaltic materials, 4% by weight sulfur and 51 p.p.m. nickel and vanadium is illustrative of such chargestock. Typical process conditions may be defined as contacting a metal and/or sulfur contaminant containing chargestock with this invention's catalyst under a hydrogen pressure of about 500 to 3,000 p.s.i.g., of 600° to 850° F temperature, and 0.1 to 5 LHSV (i.e. 0.1 to 5 volumes of chargestock per volume of catalyst per hour) based on the total complement of catalyst in the dual bed system.

The hydrogen gas which is used during the hydrodemetalation-hydrodesulfurization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

The physical characteristics and the demetalation and desulfurization activities of a typical first and second catalyst used in the dual bed system is shown in Table 1. It is noted that the first catalyst is selective for demetalation, but still has reasonably good desulfurization activity. The second catalyst has low demetalation activity by comparison.

TABLE 1

|  | SMO-8066 First Catalyst | Second Catalyst | SMO-8112 Mixed Pore |
|---|---|---|---|
|  | ←——1/32" CoMo/Al$_2$O$_3$——→ | | |
| Pore Volume, cc/g | 0.490 | 0.491 | 0.519 |
| Packed Density, g/cc | 0.752 | 0.786 | 0.710 |
| Surface Area, m$^2$/g | 104 | 286 | 264 |
| Pore Size Dist., % of pore volume, diameters, A, | | | |
| 0–30 | 4 | 7 | 12 |
| 30–100 | 10 | 90 | 55 |
| 100–200 | 67 | 1 | 8 |
| 200–300 | 10 | 0 | 8 |
| >500 | 9 | 2 | 17 |
| Catalyst Activity (1) | | | |
| % Desulfurization | 74 | 78 | 75 |
| % Demetalation | 82 | 52 | 76 |

(1) Kuwait Atm. Resid, 2000 psig, 0.75 LHSV, 700° F, 5000 SCF H$_2$/B.

Table 2 compares the fresh and aged activities of the dual catalyst sequence of this invention with the reversed sequence in which the second catalyst is disposed upstream of the first catalyst.

FIG. 4(a) demonstrates the slower aging for demetalation of the dual catalyst system of this invention compared with

TABLE 2

| | Demetallation and Desulfurization, Kuwait Atmospheric Resid* | | | | | |
|---|---|---|---|---|---|---|
| | FIRST CATALYST UPSTREAM | | | SECOND CATALYST UPSTREAM | | |
| Approximate Temperature, ° F | 675° | 725° | 775° | 675° | 725° | 775° |
| FRESH CATALYST | | | | | | |
| % Demetallation | 67 | 83 | 97 | 52 | 76 | 98 |
| % Desulfurization | 67 | 82 | 94 | 66 | 85 | 96 |
| AGED CATALYST** | | | | | | |
| % Demetallation | 42 | 63 | 84 | 33 | 63 | 81 |
| % Desulfurization | 48 | 68 | 86 | 36 | 57 | 74 |

*Run conditions: 2000 psig, approximately 0.7 LHSV, hydrogen circulation 3150–5615 scf/bbl.
**The catalyst was aged for 35 days running an atm. resid. at 2000 psig, 0.6 LHSV, 725–765° F, prior to the tests shown.

a single bed of the first catalyst alone, and with a single bed of another catalyst. That the slower aging applies to desulfurization as well as to demetalation is shown in FIG. 4(b).

It is not clear mechanistically exactly how the two catalysts cooperate to product the unexpectedly improved aging in the process of this invention. While not wishing to be bound by theory, it may be proposed that the novel first catalyst, which is selective for demetalation, protects the second catalyst from metals poisoning and fast loss of desulfurization effectiveness. The second catalyst, being highly effective for desulfurization, may contribute to the longevity of the first catalyst by contributing, in a progressively increasing degree with time on stream, to the demetalation of the feed.

The preferred first catalyst of this invention has been described and its effectiveness in the process of this invention is believed to be associated with a relatively low surface area of up to about 110 m$^2$/g and the presence of a demonstrable content of a high-temperature phase alumina, i.e. a delta and/or theta alumina. Additionally, the preferred first catalyst has a particular pore size distribution, as hereinabove specified.

While not wishing to be bound by any particular theory of operability, it is felt that the uniqueness of the first catalyst used in the process of this invention is at least partially due to the fact that the alumina catalyst base is calcined to the transition temperature of the delta and theta phases, thereby producing a specific alumina. It is felt that it is this high-temperature phase which produces the distinct pore structure and properties of the catalyst. The particular method of preparation of the catalyst of this invention is explained in detail in Example 4 of copending application Ser. No. 392,730 filed Aug. 29, 1973, incorporated herein by reference.

As noted in Alumina Properties p. 46 by Newsome, Heiser, Russel and Stumpf (Alcoa Research Laboratories, 1960), the theta alumina phase may only be reached through employing an alpha monohydrate or a beta trihydrate alumina form. Calcining temperatures required to achieve the theta phase vary depending on which alumina form is utilized as the initial alumina. An alpha monohydrate enters the gamma phase at about 500° C, crosses the transition point into the delta phase at about 860° C and enters the narrowly temperature banded theta phase at about 1060° C. The transition point between theta and alpha phases being at about 1150° C.

Figure 5:
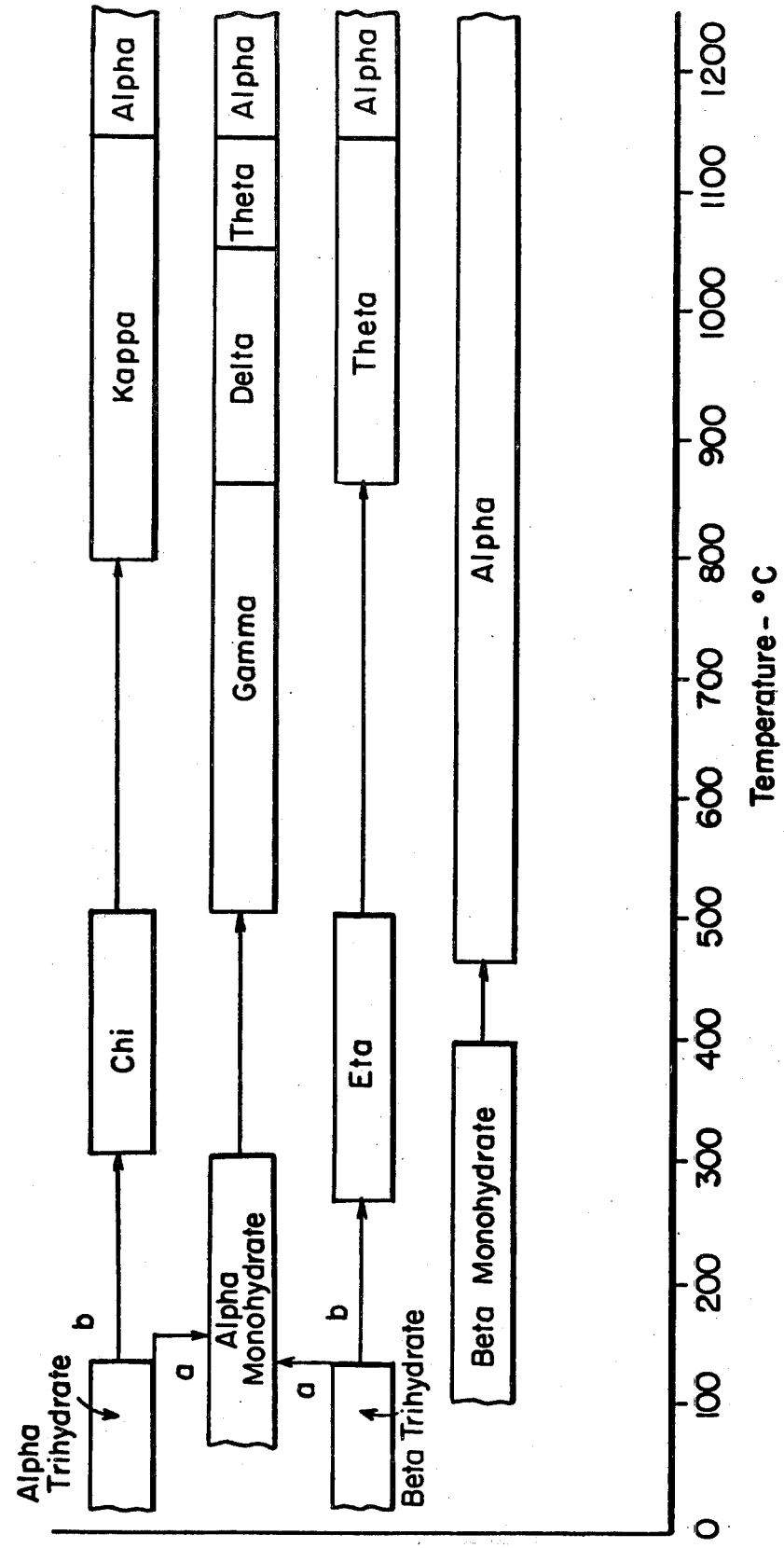
FIG. 5 is an alumina phase diagram.

When utilizing a beta trihydrate as an initial alumina, the theta phase is broader, its limits being about 860° C to about 1160° C. It should be noted that both beta trihydrate and alpha trihydrate aluminas may also be transformed into the alpha monohydrate form. The alumina phase diagram is presented in FIG. 5.

In certain circumstances, first catalysts of relatively low surface areas and having a demonstrable content of high temperature phase alumina but with a somewhat larger pore size may be used. Such catalyst are described in copending U.S. patent application Ser. No. 392,708 filed Aug. 29, 1973, the entire content of which is incorporated herein by reference.

The first catalysts herein described have been found to have a selectivity for desulfurizing asphaltenic and resinous components of crude oil or residua, as shown in FIG. 6. This feature is of interest since it could be related to the unexpected effectiveness of the dual bed system, and to reduced sulfur emission from regenerators when oils processed by this invention are subjected to a subsequent cracking operation.

What is claimed is:

1. A process for catalytically demetalizing and desulfurizing a residual oil, said process consisting essentially of: passing a mixture of hydrogen and said oil at a hydrogen pressure of about 500 to 3,000 psig, a temperature of about 600° to 850° F, and a space velocity of 0.1 to 5.0 LHSV, through a trickle bed of first catalyst, said first catalyst comprising the oxides or sulfides of a Group VIB metal and an iron group metal on a support comprising a delta or theta phase alumina, said first catalyst having also at least about 60 percent of its pore volume in pores with diameters of about 100 to 200A, at least about 5 percent of its pore volume in pores greater than 500A., and a surface area of up to about 110 $m^2/g$; and then passing said mixture of hydrogen and said oil through a bed of second catalyst disposed downstream of said first catalyst, said second catalyst comprising the oxides or sulfides of a Group VIB metal and an iron group metal on an alumina support, said second catalyst having a surface area of at least 150 $m^2/g$ and at least 50 percent of its pore volume in pores with diameters of 30 to 100A.

2. The process as claimed in claim 1 wherein said first catalyst occupies 40% to 80% of the total catalyst volume.

3. The process as claimed in claim 1 wherein said first catalyst and said second catalyst are contained in one reactor.

4. The process as claimed in claim 1 wherein said first catalyst and said second catalyst are contained in separate reactors.

5. The process as claimed in claim 2 wherein said first catalyst and said second catalyst are contained in one reactor.

6. The process as claimed in claim 2 wherein said first catalyst and said second catalyst are contained in separate reactors.

7. The process of claim 2 and wherein said process includes the step of cracking said oil following said demetalation and desulfurization steps, said cracking being done at 800° to 1500° F temperature, 1 to 5 atmospheres pressure and a space velocity of about 1 to 1000 WHSV.

8. The process of claim 2 and wherein said process includes the step of coking said oil following said demetalation and desulfurization steps, said coking being done at 800° to 1100° F temperature and 1 to 10 atmospheres pressure.

9. The process of claim 2 and wherein said process includes the step of hydrocracking said oil following said demetalation and desulfurization steps, said hydrocracking being done at 400° to 1000° F temperature and 100 to 3500 psig pressure.

* * * * *